United States Patent [19]

Fitzgerald

[11] Patent Number: 5,743,041
[45] Date of Patent: Apr. 28, 1998

[54] FLOATABLE CONTAINER APPARATUS FOR HARVESTING BRINE SHRIMP EGGS AND METHODS FOR USING SAME

[76] Inventor: Warren L. Fitzgerald, 1412 Beaconhill Dr., Murray, Utah 84123

[21] Appl. No.: 725,392

[22] Filed: Oct. 3, 1996

[51] Int. Cl.$^6$ .................................................. A01K 79/00
[52] U.S. Cl. .................. 43/6.5; 43/4.5; 210/776
[58] Field of Search .................... 43/4, 4.5, 6.5; 210/923, 776, 242.3; 56/8, 9

[56] References Cited

U.S. PATENT DOCUMENTS

| | | | |
|---|---|---|---|
| 3,700,109 | 10/1972 | Lasko | 210/923 |
| 3,768,193 | 10/1973 | London | 43/6.5 |
| 4,839,062 | 6/1989 | Sanders | 210/776 |
| 4,998,369 | 3/1991 | Lamon | 43/6.5 |
| 5,042,187 | 8/1991 | Bentzley | 43/6.5 |
| 5,457,908 | 10/1995 | Sanders | 43/6.5 |
| 5,491,922 | 2/1996 | Sanders | 43/6.5 |
| 5,513,462 | 5/1996 | Lamon | 43/6.5 |
| 5,566,492 | 10/1996 | Swenson | 43/6.5 |

*Primary Examiner*—Jack W. Lavinder
*Attorney, Agent, or Firm*—Berne S. Broadbent; Dale E. Hulse

[57] ABSTRACT

A floatable container apparatus for harvesting brine shrimp eggs is disclosed in one presently preferred embodiment of the present invention as including a buoyant container assembly having one or more ballast tanks to provide a means for raising and lowering the container in relation to the surface of the water. In addition, the container assembly comprises a collection reservoir having an internal periphery sufficient for collecting a mixture of water, brine shrimp eggs, and other debris. In operation, the container assembly may be partially submerged by introducing water into at least one ballast tank. Accordingly, a openable panel may be disposed in an open position to allow for the introduction of the floating mixture into the collection reservoir. Similarly, after a sufficient quantity of the mixture has been collected, the front panel of the container assembly may be disposed in a closed position which restricts additional fluid passage. The water within the ballast tank may then be removed and interchangeably ventilated with air, thereby increasing the buoyancy of the container. Disposed in fluid communication with an opening formed in the container assembly, an extraction assembly provides a means for extracting excess water and a meaningful portion of the unwanted debris from the mixture in the reservoir and transporting the excess water and unwanted debris back into the body of water from where it was collected. The remaining mixture of water and brine shrimp eggs housed within the container assembly may be then delivered to at least one porous container.

20 Claims, 4 Drawing Sheets

FLOATABLE CONTAINER APPARATUS FOR HARVESTING BRINE SHRIMP EGGS AND METHODS FOR USING SAME

BACKGROUND

1. The Field of the invention

This invention relates to an apparatus for harvesting a substance or material floating at or near the surface of a body of water and, more particularly, to novel systems and methods for harvesting brine shrimp eggs.

2. The Background Art

Brine shrimp are primitive crustaceans of the genus Artemia that may inhabit hypersaline environments, such as salty lakes and brine pools throughout the world. For example, the Great Salt Lake in the state of Utah is a hypersaline body of water which provides a rich environment where brine shrimp may flourish.

Normally reaching sexual maturity within approximately three weeks after hatching, brine shrimp generally reproduce about every fourth day, sometimes lasting for as long as an eight month period. Brine shrimp eggs (or cysts) are, accordingly, deposited in the surrounding body of water.

Because of their inherent buoyancy, brine shrimp eggs are routinely discovered floating at or near the surface of the water. Accordingly, brine shrimp eggs are typically found in a mixture of water, brine shrimp eggs, and other debris consisting, in a large part, of live and dead brine shrimp, discarded shell casings, wood pieces, tumbleweeds, twigs, trash, dead waterfowls and/or other types of floating debris. After the process of harvesting and separating the brine shrimp eggs from the mixture of water, brine shrimp eggs, and other debris, brine shrimp eggs generally resemble fine granules of sand. For example, a single ounce of water from the Great Salt Lake may contain up to several million brine shrimp eggs.

The eggs (or cysts) of brine shrimp are traditionally concentrated, collected, separated, cleaned, dried, and packaged for storage to provide a general source of commercial fish food. Because brine shrimp eggs have the intrinsic capability of being stored for several years as a packaged commodity in a suitable medium, the harvesting of brine shrimp eggs has developed into an expansive commercial industry.

Historically, those skilled in the art developed techniques and methods to assist in harvesting brine shrimp eggs from the shorelines of a hypersaline body of water by means of generally utilizing shovels and various netting apparatus. A significant disadvantage with prior art shoreline harvesting techniques and methods, as soon realized by those skilled in the art, is that the harvest is ultimately influenced by the conditions of the weather in relation to its inherent influence as to where, when, and if the eggs will be deposited along the shoreline.

In view of the various disadvantages of prior art shoreline harvesting techniques and methods, those skilled in the art integrated the teachings and disclosures of prior art oil-skimming devices and techniques. In particular, oil-skimming technology provided a resource of comparative technology as a result of the techniques, methods and devices developed for collecting and removing oil from a body of water. Correspondingly, oil-skimming apparatus and methods of the prior art are intimately analogous to the needs realized by those skilled in the art for harvesting brine shrimp eggs from a relative body of water.

As a result of the innate physical characteristics and nature of brine shrimp eggs in relation to oil, those skilled in the art attempted to modify the oil-skimming technology of the prior art by incorporating a means for agitating the floating mixture of water, brine shrimp eggs, and other debris into a slurry mixture and by the replacement of distillation tanks with water-permeable containers. The general purpose of agitating the floating mixture of water, brine shrimp eggs, and other debris into a slurry mixture is to provide an easier means of delivering the collected slurry mixture to at least one water-permeable container by way of influencing the water concentration of the mixture. In addition, the replacement of distillation tanks with one or more water-permeable containers provides a means for allowing the collected water to filter through the mesh material comprising the container, thereby leaving a slurry mixture of brine shrimp eggs, live and dead brine shrimp, discarded brine shrimp shell casings, pieces of wood, trash, tumbleweeds, twigs, and/or other types of floating debris within the water-permeable containers for transport to an off-water site for separating, processing, cleaning, drying, packaging, and storage.

Besides prior art skimming devices, other apparatus and methods were developed by those skilled in the art for harvesting brine shrimp eggs. For example, prior art egg harvesters were developed comprising a scooping mechanism for removing the floating mixture of water, brine shrimp eggs, and other debris from the body of water and introducing the slurry mixture of live and dead brine shrimp, brine shrimp eggs, discarded brine shrimp shell casings, pieces of wood, trash, tumbleweeds, twigs, dead waterfowl and/or other types of floating debris into one or more porous container bags. Traditionally, prior art scooping devices generally employ a series of collection members or baskets which are capable of being immersed below the surface of the body of water by means of a rotational conveyor system which provides a means for rotatably scooping the slurry mixture from the water. Prior art scooping devices for harvesting brine shrimp eggs have been found, however, to incorporate several meaningful disadvantages.

First, depending on the rotational direction of a supporting conveyor system, the rotational movement of prior art scooping devices through the body of water usually generate a stirring motion in the water which encourages the agitation of the floating mixture of water, brine shrimp eggs, and other debris, thus the brine shrimp eggs may be driven deeper under the surface of the water thereby making the potential harvest much less efficient and productive. Second, by means of utilizing a water-permeable collection member or basket, the water generally drains through the mesh screen comprising the basket and, accordingly, the brine shrimp eggs generally tend to aggregate and adhere to the collection basket making it seemingly difficult to adequately remove the eggs before the collection basket re-enters the water by way of the rotating conveyor system. Third, prior art scooping devices commonly include multiple working parts and facilitate a complicated operational system. As will be appreciated in this particular art, economic considerations carry significant weight when dealing with the highly competitive brine shrimping industry, since relatively complicated apparatus and methods are frequently found to be commercially impractical. Accordingly, even a slight saving in manufacturing costs may substantially enhance the commercial appeal of a particular component or assembly when considering issues of mass production of the product.

Consistent with the foregoing, although the assimilation of prior art oil-skimming technology and the development of prior art scooping devices in regards to harvesting brine shrimp eggs from a body of water provided a needed improvement over prior art shoreline harvesting methods, egg harvesting devices of these types embody other inherent disadvantages and limitations. For example, in general operation, brine shrimp egg harvesting apparatus and methods of the prior art usually remove an agitated slurry mixture of water, brine shrimp eggs, and other debris disposed at or near the surface of the water and provide a means for delivering the slurry mixture into one or more containers preferably formed having a porous construction. Further thereto, the porous containers of the prior art may provide a means for the water to disperse from the collected slurry mixture, whereby leaving brine shrimp eggs and other debris within one or more containers for transporting to an off-water site for separating, cleaning, dryings packaging, and storage.

By only providing a means for removing the water from the collected slurry mixture contained within the porous container bags, a significant amount of debris remains within the porous bags intimately intermixed with brine shrimp eggs. As noted above, the floating debris in the slurry mixture may include, but is not limited to, dead and live brine shrimp, discarded brine shrimp shell casings, pieces of wood, trash, tumble-weeds, twigs, dead waterfowl, and/or other types of floating material. Preferably, this slurry mixture may be disposed in prior art porous container bags and transported to the shore of the body of water where the porous containers can be taken to a processing plant to separate and remove the unwanted debris from the slurry mixture of brine shrimp eggs. Whereas, if the slurry mixture is not timely processed, the quality of the collected brine shrimp eggs will degrade and potentially spoil.

Similarly, apparatus and methods for harvesting brine shrimp eggs of the prior art generally deposit the collected slurry mixture retrieved from the body of water directly into porous container bags. In doing so, the slurry mixture disposed within the porous container bags generally includes, for example, live and dead brine shrimp which are typically discarded during the processing of the brine shrimp eggs as a commercial fish food. Accordingly, the integrity of this natural resource is expended, whereby affecting any chance of future reproduction among those live brine shrimp captured within the porous container bags and further accommodating a depletion in the ecological food chain that these dead and live brine shrimp play in the natural scheme of things in relation to the body of water from where they were extracted.

Another serious disadvantage with prior art brine shrimp harvesting apparatus and methods is that the greater the quantity of the debris collected and retained within the porous container bags, the less the overall amount of brine shrimp eggs that can be retained contiguously within the container bags. Consequently, a substantial amount of time and labor may be required to move the harvesting apparatus to shore in order to unload the porous container bags filled with this slurry mixture of brine shrimp eggs and other floating debris which may ultimately have an effect on the overall productivity and economic output of the brine shrimp egg harvesting operation. If brine shrimp egg harvesting equipment is tied up by way of unloading containers of the slurry mixture, competitors will, more often than not, have an opportunity to stake valuable claims to the remaining colonies of brine shrimp eggs available on the body of water for purposes of harvesting.

As illustrated by the foregoing and based on the number of prior patents and other disclosures, efforts are continuously being made in an attempt to more efficiently harvest brine shrimp eggs and remedy many of the above-identified disadvantages. While the prior art brine shrimp egg harvesting apparatus and methods discussed herein may appear generally suitable for their intended purposes, these prior art harvesting devices and methods nevertheless leave much to be desired from the standpoint of simplicity of construction, manufacturing costs, and effectiveness of operation. Whereas, none of the prior art disclosures suggest or teach the present inventive system or combination of elements for a floatable container apparatus and methods for harvesting brine shrimp eggs, as herein described and claimed.

BRIEF SUMMARY AND OBJECTS OF THE INVENTION

In view of the foregoing, it is a primary object of the present invention to provide a novel floatable container apparatus and methods for harvesting brine shrimp eggs.

It is also an object of the present invention to provide a floatable container apparatus for harvesting brine shrimp eggs which is capable of harvesting a mixture of water, brine shrimp eggs, and other debris while returning a substantial portion of the debris, including dead and live brine shrimp, back into the body of water from where it was collected, thus preserving the integrity of this natural resource for future brine shrimp reproduction and accommodating the ecological food chain that dead and live brine shrimp play in the natural scheme of things.

Further, it is an object of the present invention to provide a floatable container apparatus and methods for harvesting brine shrimp eggs which is capable of collecting a mixture of water, brine shrimp eggs, and other debris without agitating the mixture into a slurry.

It is a still further object of the present invention to provide a floatable container apparatus for harvesting brine shrimp eggs which provides a means for separating unwanted debris from the mixture of water, brine shrimp eggs, and debris whereby depositing the remaining brine shrimp eggs into one or more water permeable containers.

In addition, it is an object of the present invention to provide a floatable container apparatus and methods for harvesting brine shrimp eggs which simplifies the harvesting process and which is easy to use, economically viable, long lasting and relatively trouble free in operation.

Similarly, it is an object of the present invention to provide a floatable container apparatus and methods for harvesting brine shrimp eggs which comprises few working parts whereby being simple in construction and efficient in operation.

It is also an object of the present invention to provide a floatable container apparatus which is capable of providing an efficient mode of operation with regards to the time and labor expended by way of separating the brine shrimp eggs from the unwanted debris collected as part of the mixture of water, brine shrimp eggs, and other debris thus increasing overall productivity.

Consistent with the foregoing objects, and in accordance with the invention as embodied and broadly described herein, a floatable container apparatus for harvesting brine shrimp eggs comprises a buoyant container assembly having at least one ballast tank integrally formed therein. The ballast tank preferably comprises conventional fill and vent tubing to provide a means for raising and lowering the container assembly in relation to the surface of the water. The container assembly further comprises a collection reservoir having an internal periphery being dimensionally sufficient for collecting a mixture of water, brine shrimp eggs, and other debris generally floating at or near the surface of a body of water.

In operation, water is preferably introduced into at least one ballast tank to partially submerge the container assembly. After being partially submerged, a front panel of the container assembly may be selectively disposed in an open position to allow the floating mixture of water, brine shrimp eggs, and other debris to be introduced into the collection reservoir. Similarly, after a sufficient quantity of the mixture has been collected within the periphery of the collection reservoir, the front panel of the container assembly may be selectively disposed in a closed position whereby restricting the passage of any material or substance between the collection reservoir and the body of water in which the container assembly is floating. The water disposed within the ballast tank may then be removed by conventional vent tubing and interchangeably ventilated with air, thereby increasing the buoyancy of the container assembly to encourage the ascension of the container assembly in relation to the surface of the body of water.

Engageably disposed in fluid communication with an opening formed in the container assembly, an extraction assembly comprises a means for extracting excess water and a significant portion of the unwanted debris from the mixture collected in the collection reservoir and transporting the excess water and debris back into the body of water from where it was collected. The remaining mixture of water and brine shrimp eggs housed within the collection reservoir of the container assembly may be then delivered to at least one porous container.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 4, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
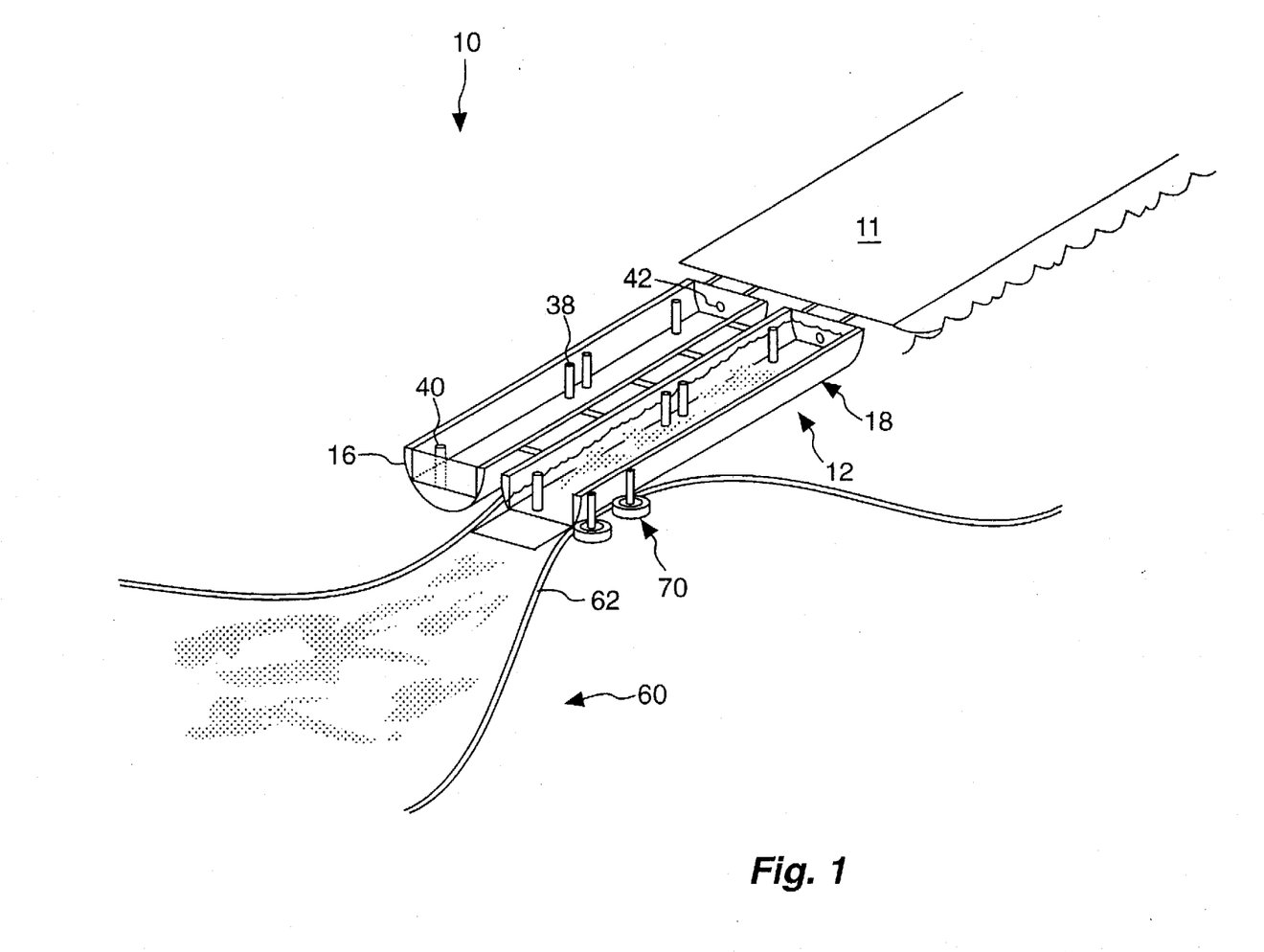
FIG. 1 a perspective view of a floatable container apparatus for harvesting brine shrimp eggs in accordance with one presently preferred embodiment of the present invention.
Figure 2:
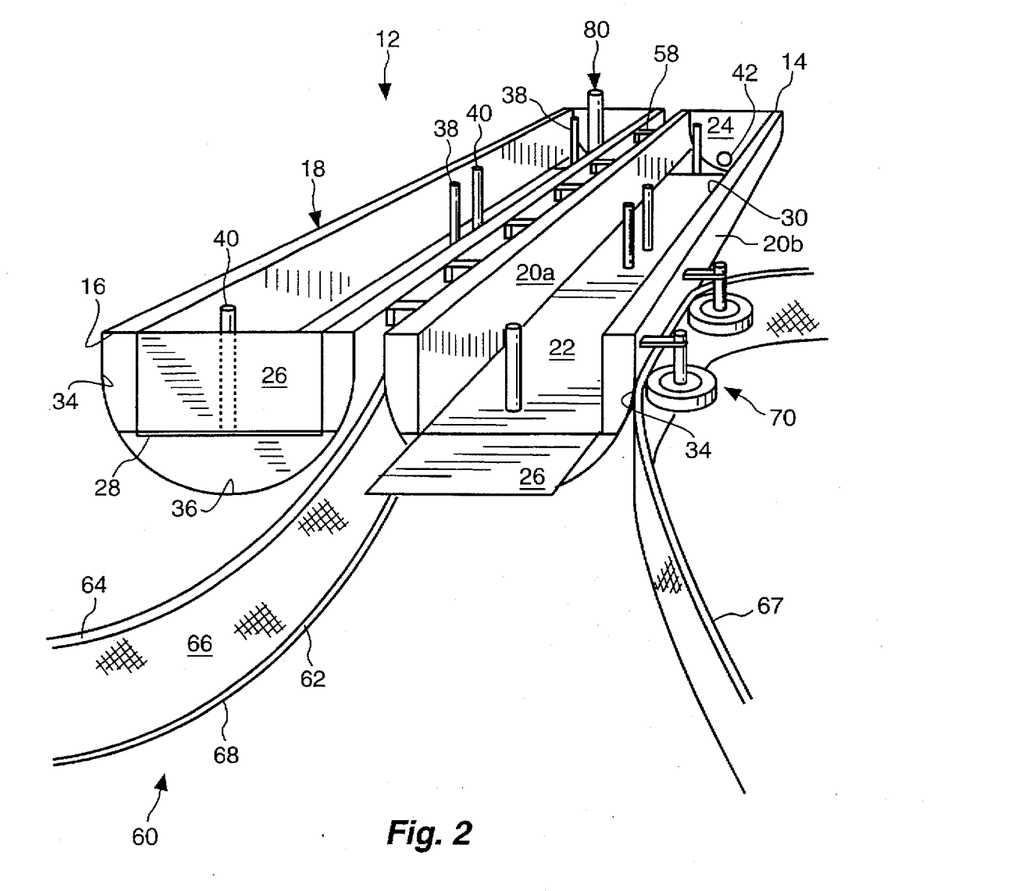
FIG. 2 is an exploded view illustrating one presently preferred embodiment of a container assembly of one presently preferred embodiment of the floatable container apparatus as shown in FIG. 1.

One presently preferred embodiment of the present invention, designated generally at 10, is best illustrated in FIGS. 1 and 2. As shown, a floatable container apparatus for harvesting brine shrimp eggs 10 preferably comprises a buoyant container assembly 12 having one or more ballast tanks 36 integrally formed therein which provide a means for raising and lowering the container assembly in relation to the surface of the water. Structurally, the container assembly 12 further includes a collection reservoir 30 having an internal periphery which is dimensionally sufficient for collecting a mixture of water, brine shrimp eggs, and other debris generally floating at or near the surface of a body of water.

In operation, a quantity of water may be introduced by means of conventional fill tubing 38 into at least one ballast tank 36 sufficient to partially submerge the container assembly 12 in relation to the surface of the water. With the container assembly 12 in a partially submerged disposition, a front panel 26 of the container assembly 12 may be selectively arranged into an open position to provide a means for allowing the mixture of water, brine shrimp eggs, and other debris to be introduced into the collection reservoir 30. After a sufficient quantity of the mixture of water, brine shrimp eggs, and other debris has been collected within the collection reservoir 30, the front panel 26 of the container assembly 12 may be selectively disposed into a closed position whereby providing a means for restricting any fluid passage between the collection reservoir 30 and the body of water in which the container assembly 12 is floating. The water within one or more of the ballast tanks 36 may then be removed by means of conventional vent tubing 40 and the tank interchangeably ventilated with air, thereby increasing the internal buoyancy of the container assembly 12 and encouraging the container assembly 12 to begin its ascension in relation to the surface of the body of water.

Engageably disposed in fluid communication with an opening 42 formed in the elongated body 18 of the container assembly 12, an extraction assembly 44 comprises a means for removing excess water and a significant portion of the unwanted debris from the collected mixture of water, brine shrimp eggs, and other debris within the collection reservoir 30. Additionally, the extraction assembly 44 includes a means for transporting the excess water and unwanted debris into the body of water from where it was collected. Consistent with the foregoing, a mixture of water, brine shrimp eggs, and a small proportionate amount of debris retainably disposed within the collection reservoir 30 of the container assembly 12 may be then delivered by means of a delivery assembly 80 to at least one porous container (not shown) for storage.

In one presently preferred embodiment of the floatable container apparatus 10 of the present inventions a concentration assembly 60 is preferably provided which comprises a means for concentrating the mixture of water, brine shrimp eggs, and other debris and for influencing its introduction into the internal periphery of the collection reservoir 30 of the container assembly 12, as best illustrated in FIGS. 1 and 2. The concentration assembly 60 preferably comprises a flexible containment boom apparatus 62 removably disposed in operable relation to a conventional boom retrieval system 70. The boom retrieval system 70 may include a manual or automated means which facilitates the retrieval of the containment boom apparatus 62 from an extended position in relation to the body of water.

In preferred structural relationship, the boom retrieval system 70 may be mounted contiguous the first end 14 of the container assembly 12. The boom retrieval system 70 includes a conventional retrieval assembly comprising a guide wheel, an engagement wheel, a driving wheel, an axle for each wheel, a support member for each axle, and a mechanical or electro-mechanical driving means. In preferred operation, the boom retrieval system 70 comprises a means for retaining a portion of the elongated body of the containment boom apparatus 62 substantially flush in movable relation to the front panel 26 at the first end 14 of the container assembly 12 to provide a means for readily introducing the concentrated mixture of water, brine shrimp eggs, and other debris into the internal periphery of the collection reservoir 30 of the container assembly 12. It will be readily appreciated by those skilled in the art that other modifications and adaptations for concentrating the mixture of water, brine shrimp eggs, and other debris are possible which are consistent with the spirit and scope of the present invention.

In one presently preferred embodiment of the concentration assembly 60 of the present invention, the containment boom apparatus 62 comprises a buoyant crown 64, a skirt 66, a reeling line 67, and sufficient weighted members 68 disposed in relation to the skirt 66 to provide a weighted means for retaining the skirt below the surface of the body of water. Preferably, the crown 64 is formed of a sufficiently buoyant material which facilitates a means for maintaining the buoyancy of the containment boom apparatus 62 from sinking, especially in relation to the disposition of the weighted members 68. As will be readily appreciated by those skilled in the art, any suitable buoyant material and/or variation in the structural design of the containment boom apparatus 62 of the concentration assembly 60 are anticipated by the present invention. For example, the buoyant crown 64 may include one or more pieces of Styrofoam® housed within a solid covering to provide sufficient structural integrity and support to the crown 64, while further retaining the dimensional shape and buoyancy of the crown. Similarly, those skilled in the art will readily recognize other possible modifications and adaptations in relation to the containment boom apparatus 62 which are consistent with the spirit and scope of the present invention and thereby anticipated herein.

The linear length of the containment boom apparatus 62 may vary from a few feet to a thousand feet or more, depending upon the size needed to surround one or more floating colonies of brine shrimp eggs. Additionally, the vertical length of the skirt 66 may be disposed slightly below the surface of the water to several feet or more. In one presently preferred embodiment of the present invention, the vertical length of the skirt 66 preferably extends between approximately 15 cm and 60 cm below the surface of the water. Additionally, the skirt 66 of the containment boom apparatus 62 is preferably formed of a solid material thus providing a non-permeable barrier to concentrate the mixture of water, brine shrimp eggs, and other debris. As will be appreciated by those skilled in the art, the relative dimensions of the containment boom apparatus 62 and the skirt 66 can, of course, vary dependent upon the size of the collection pool and/or the proportional size of the materials or substances being harvested from the water.

It will be readily apparent to those skilled in the art that other conventional means of concentrating the floating material of water, brine shrimp eggs, and other debris may be incorporated by the present invention while maintaining the inventive principles as set forth herein. For example, an alternate embodiment of the concentration assembly 60 may comprise one or more conventional V-shaped booming arms engageably disposed in relation to the first end 14 of the container assembly 12 and supportably extending substantially outward therefrom. Moreover, the concentration assembly 60 may incorporate conventional skimming technology as is readily known and utilized in the art with the inclusion of some structural modifications to the present invention. It is intended, therefore, that the examples of the concentration assembly 60 as provided herein be viewed as exemplary of the principles of the present invention, and not as restrictive to a particular structure for implementing those principles.

As shown in FIG. 2, one or more container assemblies 12 may be preferably disposed in supportably relation to a suitable buoyant support member 11. The buoyant support member 11 preferably includes a propulsion system being sufficient for supportably moving one or more container assemblies 12 through a body of water. As illustrated in one presently preferred embodiment of the present invention, the buoyant support member 11 comprises a watercraft (e.g., barge). In an alternate embodiment of the present invention, one or more container assemblies 12 may be structurally disposed independent of the buoyant support member 11, whereby including a propulsion system mountably disposed in direct relation thereto in order to provide a means for moving the container assembly 12 through the water.

In one presently preferred embodiment of the present inventions two or more container assemblies 12 may be engageably disposed side-by-side in a substantially parallel relationship by conventional fasteners 58 to enhance the lateral stability of the floatable container apparatus 10. Structurally, the fasteners 58 may provide a fixed or removable engagement between adjacent container assemblies 12. Correspondingly, the buoyant nature of each container assembly 12 is generally independent in relation to another container assembly. However, because the container assemblies 12 are engageably disposed therebetween by means of the fasteners 58, the floatable or submersible characteristics of one container assembly 12 will clearly affect the disposition of the second attached container assembly.

As will be readily appreciated by those skilled in the arts at least one container assembly 12 is required in order to accommodate the novel and inventive principles set forth herein. It is intended, therefore, that the examples provided herein be viewed as exemplary of the principles of the present invention, and not as restrictive to a particular structure or structures for implementing those principles.

Figure 3:
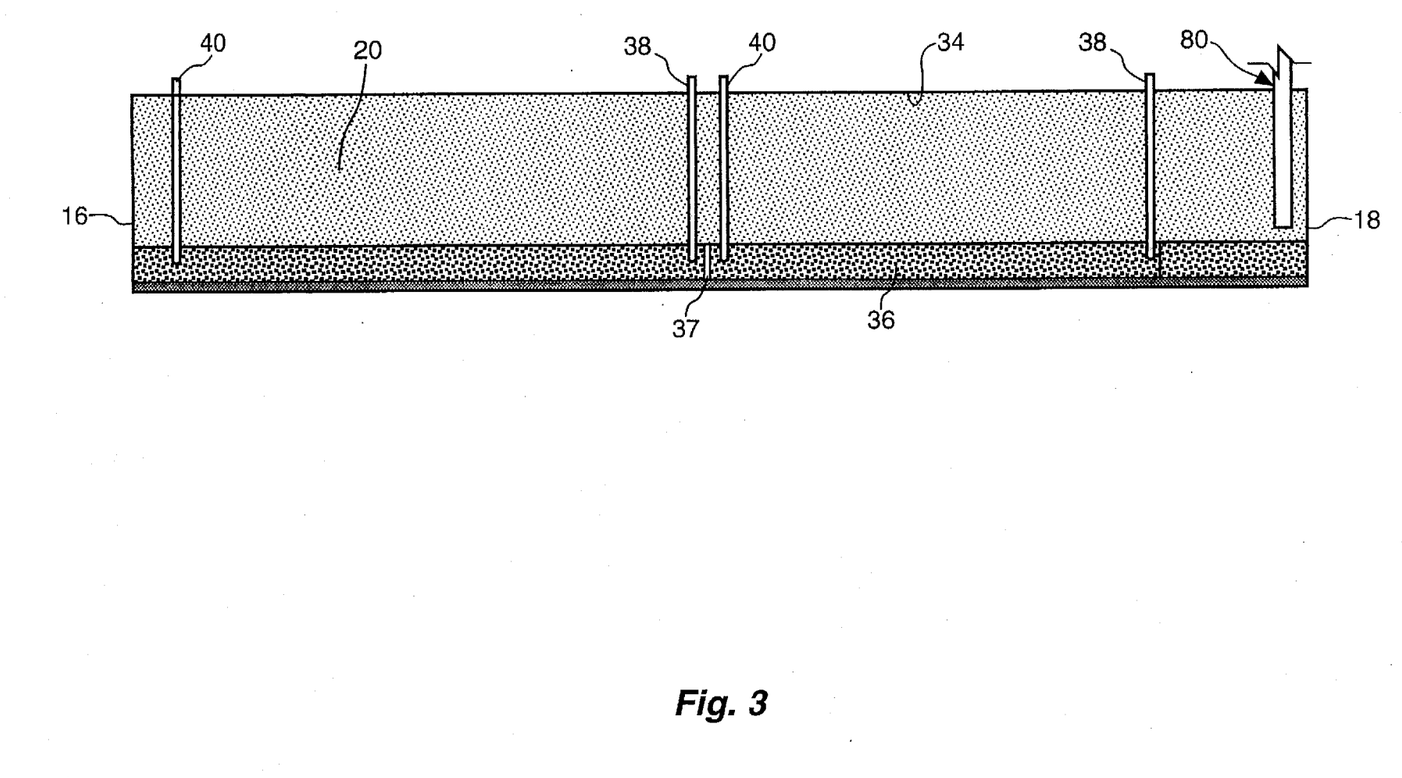
FIG. 3 is a side elevational view of one presently preferred embodiment of container assembly of one presently preferred embodiment illustrating an air-tight chamber disposed in the side wall and the ballast tank integrally formed in the elongated body of the container assembly.

As illustrated in FIGS. 1, 2 and 3, the container assembly 12 preferably comprises an elongated body 18 disposed 8 between the first and second ends 14, 16 of the container assembly 12. In one presently preferred embodiment of the present invention, the elongated body 18 of the container assembly 12 is preferably formed having a substantially semi-cylindrical configuration. It will be appreciated that although the present invention is illustrated and described in connection with a generally semi-cylindrical configurations those skilled in the art will readily recognize that other geometrical configurations are possible. In this regard, the utilization of a generally semi-cylindrical configuration is thus by way of illustration only and not by way of limitation.

The elongated body 18 of the container assembly 12 may be formed comprising at least two opposing side walls 20a, 20b, a bottom panel 22, a back panel 24, and a front openable panel 26. In preferred construction, the two opposing side walls 20a, 20b may be disposed between the first and second ends 14, 16 of the container assembly 12 in a spaced-apart relationship and preferably arranged substantially parallel to each other. Disposed substantially horizontal in relation to the surface of the water, the bottom panel 22 may be formed substantially transverse the side walls 20a, 20b and comprised having a longitudinal length which substantially corresponds to the longitudinal length of the two opposing side walls 20a, 20b, thus providing a contiguous engagement therebetween. Further, the back panel 24 and the front panel 26 are preferably disposed substantially perpendicular to the bottom panel 22 and generally extend substantially transverse in relation to the two opposing side walls 20a, 20b.

In preferred construction, the elongated body 18 of the container assembly 12 which includes the two opposing side walls 20a, 20b, the bottom panel 22, the back panel 24, and the front panel 26 may be formed of a sufficiently rigid, solid material. For example, the various structural components of the container assembly 12 may be comprised of a suitable metal or metal alloy, such as stainless steel or aluminum, having the general qualities and characteristics of being significantly immutable to the deterioration which may be caused as a result of continuous immersion in a hypersaline environment, as to which the present invention is preferably operated. It will be readily appreciated by those skilled in the art, however, that other suitable materials, such as, wood, fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, foamed, or laminated, or any other suitable composite material are readily possible which are consistent with the spirit and scope of the present invention.

In one presently preferred embodiment of the container assembly 12, the two opposing side walls 20a, 20b, the bottom panel 22, the back panel 24, and the front panel 26 are disposed in contiguous relationship to each other in such a manner so as to form, in combination, a collection reservoir 30. In preferred capacity, the collection reservoir 30 comprises an internal periphery having a dimensionally sufficient surface area for collecting a specified amount of a mixture of water, brine shrimp eggs, and other debris generally floating at or near the surface of a body of water. The other debris in the mixture may include, for example, but is not limited to, dead and live brine shrimp, discarded brine shrimp shell casings, pieces of wood, trash, tumbleweeds, twigs, dead waterfowl, and/or other types of materials or substances generally floating at or near the surface of a body of water comprising a hypersaline environment.

As noted above, the first panel 26 is preferably disposed at the first end 14 of the container assembly 12 and formed having a means for being selectively positionable between an open position and a closed position. Operatively disposed in an openable relationship to the two opposing side walls 20a, 20b, the front panel 26 preferably provides a gating member or solid door. In particulars the front panel 26 provides a general means for regulating the introduction of the floating mixture of water, brine shrimp eggs, and other debris into the confines of the internal periphery of the collection reservoir 30 of the container assembly 12, as defined by its structural components. Similarly, the front panel 26 may be selectively disposed in a closed position whereby restricting any fluid passage between the collection reservoir 30 and the body of water in which the container assembly 12 is floating.

In one presently preferred embodiment of the present invention, the front panel 26 may be hingeably attached at the first end 14 of the container assembly 12 by means of a conventional hinge mechanism. A locking member (not shown) may also be provided for locking the front panel 26 into the open position or, in the alternative, into the closed position, whereby providing a means for retaining the mixture of water, brine shrimp eggs, and other debris within the internal periphery of the collection reservoir 30. In addition, fluid impermeable ribbing may be disposed in relation to the bottom and sides of the front panel 26 to prevent the fluid passage of the mixture of water, brine shrimp eggs, and other debris collected within the collection reservoir 30 of the container assembly 12 therethrough when the front panel 26 is selectively disposed in the closed position.

Those skilled in the art will readily recognize other possible modifications and adaptations for regulating the flow of the mixture of water, brine shrimp eggs, and other debris into the collection reservoir 30 of the container assembly 12 which are consistent with the spirit and scope of the present invention. For example, the front panel 26 may be structurally disposed in relation the container assembly 12 by means of a slidable engagement, a frictional engagement, a pivotal engagement, or any other suitable openable engagement. It is intended, therefore, that the examples provided herein be viewed as exemplary of the principles of the present invention, and not as restrictive to a particular structure or structures for implementing those principles.

Because the floatable container apparatus 10 of the present invention would tend to sink with the front panel 26 of the container assembly 12 disposed in the open position thus allowing water to be introduced within the collection reservoir 30, one or more floatation apparatus are preferably provided in relation to the buoyant container assembly 12. These floatation apparatus generally provide a means for maintaining the overall buoyancy of the container assembly 12 in relation to the surface of the body of water. For example, an air-tight chamber 34 may be integrally formed within one or more of the two opposing side walls 20a, 20b of the container assembly 12 to provide internal buoyancy to the floatable container apparatus 10 of the present invention. Moreover, one or more air-tight chambers 34 disposed within the side walls 20a, 20b may alternatively be replaced by some other suitable floatation support devices, such as, for example, rubber pontoons, metal pontoons, or any other suitable buoyant material which will keep the container assembly 12 substantially afloat when the front panel 26 is disposed in the open position.

Additionally, the container assembly 12 may comprise at least one internally disposed ballast tank 36 providing a means for controllably facilitating the floatation and partial submergence of the container assembly 12 in relation to the surface of the body of water. Two or more ballast tanks 36 may be integrally formed within the elongated body 18 of the container assembly 12 or disposed in supportable relation thereto. If two or more ballast tanks 36 are provided, each one of the ballast tanks 36 may be individually controllable by means of separate conventional fill and vent tubing 38, 40.

In one presently preferred embodiment of the present invention, as generally illustrated in FIG. 3, a ballast tank 36 is preferably formed within the substantially semi-cylindrical elongated body 18 of the container assembly 12 and structurally disposed beneath the bottom panel 22 of the collection reservoir 30. Because the ballast tank 36 is preferably formed within the internal surface area of the elongated body 18 of the container assembly 12, conventional vent tubing 40 may be structurally incorporated to engageably dispose the internal surface area of the ballast tank 36 and provide a passageway for air to be introduced or discharged therethrough. Correspondingly, conventional fill tubing 38 may be structurally incorporated to engageably dispose the internal surface area of the ballast tank 36 and provide a means for introducing or removing a fluid, such as water, therethrough.

As will be readily appreciated by those skilled in the art, water may be introduced into the ballast tank 36 to increase the weight of the container assembly 12, thus providing a means for encouraging the partial submergence of the container assembly 12. Simultaneously, upon the removal of the water introduced within the internal periphery of the ballast tank 36 by means of the fill tubing 38 and a conventional pumping mechanism, air may be introduced into the internal surface area of the ballast tank 36 by means of the vent tubing 40 whereby influencing the floatation capability of the container assembly 12.

Consistent with the foregoing, to adjust the level of the partial submergence of the container assembly 12, a sufficient quantity of water may be introduced or extracted into one or more container assemblies 12 by means of the fill and vent tubing 38, 40. Furthermore, a water tight petition or divider 37 may be disposed within the internal periphery of a ballast tank 36 to form two or more separate internal ballast tanks. The petition or divider 37 may be disposed longitudinally and/or transverse the opposing side walls 20a, 20b. By means of incorporating at least two individually separate ballast tanks 36 disposed within the elongated body 18 of the container assembly 12, the pitch, attitude, and leveling of the floatable container apparatus 10 may be easily controllable by an operator of the present invention.

Whereas in operation, when the mixture of water, brine shrimp eggs, and other debris floatably enters the collection reservoir 30 of the container assembly 12, a point of equilibrium is generally maintained such that the floatable container apparatus 10 is preferably disposed in a semi-submerged position in relation to the surface of the water with the front panel 26 disposed in the open position. This allows for the free movement of the mixture of water, brine shrimp eggs, and other debris or anything else suspended at or near the surface of the water to flow into the collection reservoir 30. Based on the foregoing, the ballast chambers 36 provide a means for improving the stability and for controlling the draft (ascent or descent) of one or more container assemblies 12 in relation to the surface of the water in which the floatable container apparatus 10 is floating.

Figure 4:
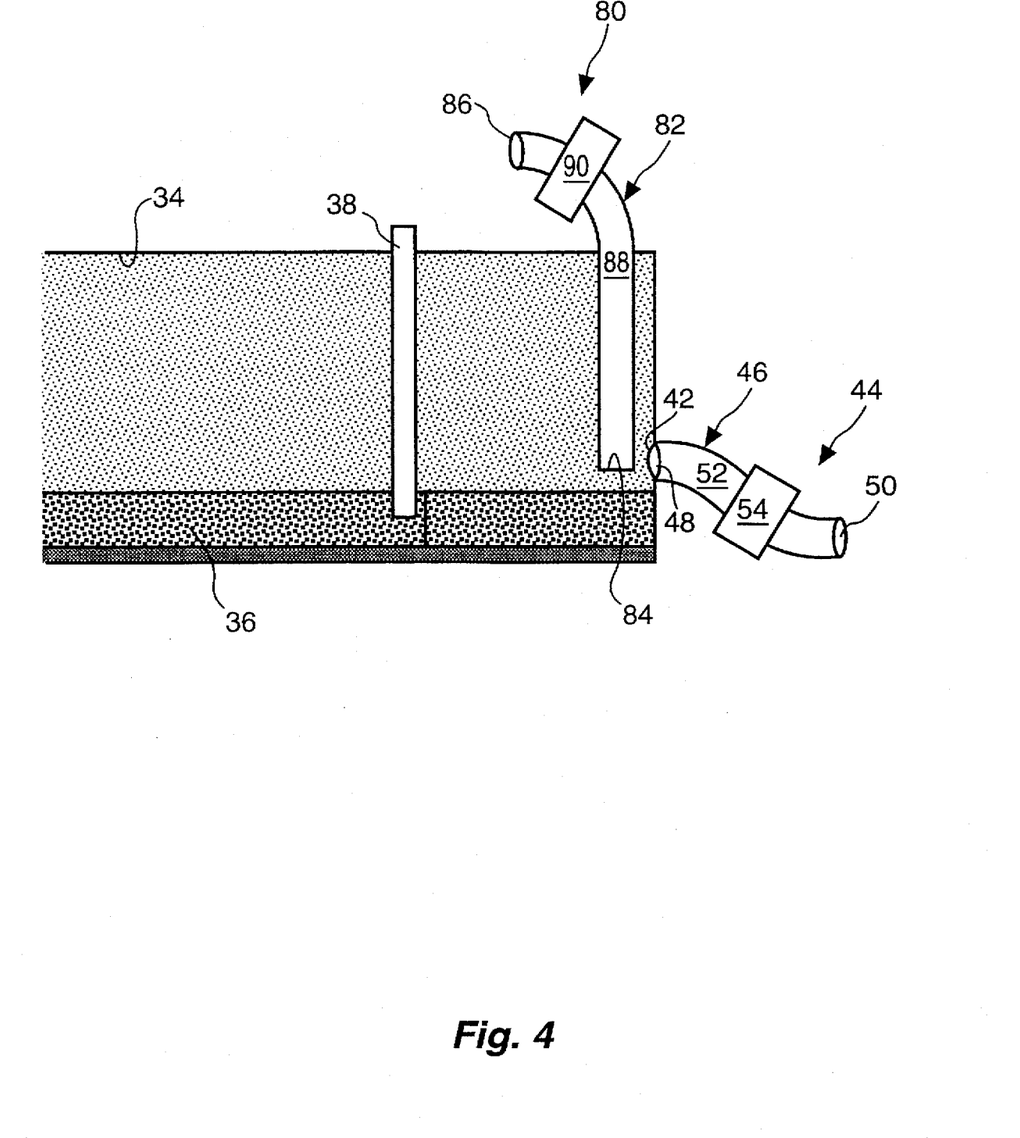
FIG. 4 is an exploded side elevational view of the container assembly of one presently preferred embodiment of the present invention illustrating the opening formed in the back panel, as well as one presently preferred embodiment of the extraction assembly and the delivery assembly.

In one presently preferred embodiment of the present inventions an opening 42 may be integrally formed in the container assembly 18, as best illustrated in FIGS. 3 and 4. Preferably, the opening 42 is disposed in a lower portion of the back panel 24 of the container assembly 12 to provide a means through which excess water and unwanted debris may be removed from the collected mixture of water, brine shrimp eggs, and other debris housed within the collection reservoir 30. The opening 42 preferably comprises an internal periphery sufficient for allowing the excess water and unwanted debris to readily pass therethrough.

In the operational design of one presently preferred embodiment, at least one opening 42 is preferably formed in the back panel 24 of the container assembly 12 and generally disposed below the surface of the collected mixture. It will be readily appreciated by those skilled in the art, however, that one or more openings 42 may alternatively be disposed in the back panel 24, the bottom panel 22, and/or any of the two opposing side walls 20a, 20b, as long as the general disposition of the opening(s) 50 are relatively disposed below the surface of the mixture of water, brine shrimp eggs, and other debris contained within the collection reservoir 30.

As best illustrated in FIG. 4, the opening 42 may generally configured to communicate with an extraction assembly 44 disposed in connection therewith. The extraction assembly 44 comprises an extraction tube 46 and a collection pump 54. The extraction tube 46 includes a first end 48, a second opposing end 50, and an intermediate portion 52 disposed therebetween. Preferably, the extraction tube 46 is engageably disposed between the opening 42 formed in the container assembly 12 and the body of water in which the floatable container apparatus 10 is floating.

In operation, the collection pump 54 provides a conventional delivery means having sufficient internal capacity for transporting excess water and unwanted debris readily extracted from the mixture of water, brine shrimp eggs, and other debris housed within the collection reservoir 30 of the container assembly 12 by way of the extraction tube 46, as best illustrated in FIG. 4. Correspondingly, the second end 50 of the extraction tube 46 is preferably disposed over the side of the container assembly 12, thereby providing a means for depositing the excess water and unwanted debris back into the body of water from where it came.

The opening 42 generally provides a means for focusing the excess water and unwanted debris extracted from the collected mixture within the collection reservoir 30 into the first end 48 of an extraction tube 46 of the extraction assembly 44. It will be appreciated by those skilled in the art that since the dimensional size and shape of the opening 42 formed in the container assembly 12 must generally correspond to the dimensional size and shape of the first end 48 of the extraction tube 46, it is anticipated that various shapes and sizes are possible to accommodate the passage of different materials or substances.

Upon extraction, the excess water and a significant portion of unwanted debris removed from the mixture water, brine shrimp eggs, and other debris is preferably transported from the collection reservoir 30 of the container assembly 12 and deposited back into the body of water in which the floatable container apparatus 10 is floating. As will be readily appreciated by those skilled in the art, not all the unwanted debris from the mixture of water, brine shrimp eggs, and other debris are readily removed in accordance with the inventive principles set forth herein. It will be apparent to those in the art, however, that a meaningful amount of the unwanted debris including, for example, but not limited tog dead and live brine shrimp, are returned to the body of water in order to provide a means for preserving this natural resource whereby facilitating future brine shrimp reproduction and further accommodating the ecological food chain that dead and live brine shrimp play in the natural scheme of things.

Structurally similar in construction to the extraction assembly 44, a delivery assembly 80 is preferably disposed in relation to the collection reservoir 30 in such a manner so as to provide a means for removing the remaining mixture of water, brine shrimp eggs, and other debris contained within the container assembly 12 and transporting the mixture into a corresponding container assembly 12 or, in the alternative, depositing the mixture into at least one water-permeable container (not shown). Moreover, the collection reservoir 30 of a second container assembly 12b may be consecutively filled with a mixture of water, brine shrimp eggs, and other debris without transporting the remaining mixture of water, brine shrimp eggs, and other debris collected in the first container assembly 12 to the second container assembly 12 or another corresponding container assembly.

In one presently preferred embodiment of the present invention, the delivery assembly 80 comprises a delivery tube 82 and a conventional suction pump 90. The delivery tube 82 includes a first end 84, a second opposing end 86, and an intermediate portion 88 disposed therebetween. Preferably, the first end 84 of the delivery tube 82 is selectively disposed within the collection reservoir 30 of the container assembly 12 and disposed preferably below the surface of the remaining mixture of water, brine shrimp eggs, and other debris. By placing the first end 84 of the delivery tube 82 below the surface of the mixture of water, brine shrimp eggs, and other debris, the suction pump 90 correspondingly provides a sufficient suction means for removing the remaining mixture.

In operation, the delivery tube 82 is formed having a sufficient internal capacity for transporting the remaining mixture of water, brine shrimp eggs, and other debris disposed within the collection reservoir 30 of the container assembly 12. In operation, the second end 86 of the delivery tube 82 may be disposed in fluid communication with one or more water-permeable containers (not shown), such as, for example, conventional porous container bags utilized in this particular industry. It will be readily appreciated by those skilled in the art that since the dimensional size and shape of the internal surface area of the delivery tube 82 must generally correspond to the dimensional size and shape of the material or substance being collected, it is anticipated that various shapes and sizes of the delivery tube 82 are possible to accommodate the passage of different materials or substances.

In an alternate preferred embodiment of the present invention, the delivery assembly 80 may operatively replace the opening 42 formed in the body of the container assembly 12 and the extraction assembly 44 disposed in fluid communication with the opening 42. Structurally, the working components of the delivery assembly 80 may provide for removing the excess water and a significant portion of the unwanted debris from the collected mixture of water, brine shrimp eggs, and other debris contained within the collection reservoir 30 in a same or similar manner as the removal of the remaining mixture of water, brine shrimp eggs, and other debris. Correspondingly, the delivery assembly 80 may further provide for transporting the excess water and unwanted debris extracted from the collection reservoir 30 and delivering it back into the body of water from where it was collected.

Although numerous techniques and methods are contemplated by the present invention, one presently preferred method for harvesting brine shrimp eggs may comprise the steps of: (1) partially submerging the container assembly 12 of the present invention in relation to the surface of a body of water; (2) collecting a mixture of water, brine shrimp eggs, and other debris floating at or near the surface of a body of water; (3) extracting excess water and a substantial portion of the unwanted debris from the collected mixture disposed within the container assembly 12; (4) depositing the excess water and unwanted debris extracted from the container assembly into the body of water from where it came, whereby preserving a natural resource by means of facilitating the future reproduction of these brine shrimp and accommodating the ecological food chain that dead and live brine shrimp play in the natural scheme of things; (5) increasing the buoyancy capacity of the container assembly 12 to affect its ascension in relation to the surface of the water; and (6) delivering the remaining mixture of water, brine shrimp eggs, and other debris to a second corresponding container assembly or, in the alternative, to at least one porous container. Additionally, the presently preferred method of harvesting brine shrimp eggs of the present invention may include a step of concentrating the mixture of water, brine shrimp eggs, and other debris before introducing the mixture into the container assembly 12.

As will be readily appreciated by those skilled in the art, other possible modifications and adaptations to the presently preferred method for harvesting brine shrimp eggs are possible which are consistent with the spirit and scope of the present invention. For example, an alternate preferred method may include the steps of: (1) obtaining the floatable container apparatus for harvesting brine shrimp eggs 10 of the present invention, as disclosed herein; (2) concentrating a mixture of water, brine shrimp eggs, and other debris by means of manipulating a concentration member 60 around the mixture of water, brine shrimp eggs, and other debris so as to concentrate the mixture before its entry into a container assembly 12; (3) partially submerging the container assembly 12 of the present invention in relation to the surface of a body of water; (4) once the appropriate equilibrium is reached between the container assembly 12 and the body of water, disposing a front panel 26 of the container assembly 12 in an open position to provide a fluid opening for passage of the mixture of water, brine shrimp eggs, and other debris into the internal periphery of a collection reservoir 30; (5) introducing the concentrated mixture of water, brine shrimp eggs, and other debris within the collection reservoir 30; (6) disposing the front panel 26 into a closed position, thus restricting any fluid passage between the collection reservoir 30 and the body of water in which the container assembly 12 may be floating; (7) extracting excess water and a substantial portion of the unwanted debris from the collected mixture disposed within the collection reservoir 30; (8) depositing the excess water and unwanted debris extracted from the collection reservoir 30 into the body of water from where it came, whereby preserving a natural resource by means of facilitating the future reproduction of these brine shrimp and providing a means for accommodating the ecological food chain that dead and live brine shrimp play in the natural scheme of things; (9) increasing the buoyancy capacity of the container assembly 12 to affect its ascension in relation to the surface of the water; and (10) delivering the remaining mixture of water, brine shrimp eggs, and other debris to a second corresponding container assembly or, in the alternative, to at least one porous container. One presently preferred method of harvesting brine shrimp eggs of the present invention may further include the step of introducing a fluids such as water, into at least one ballast tank 36 integrally formed within the elongated body 18 of the container assembly 12 to influence the partial submergence of the floatable container apparatus 10. Similarly, to encourage the ascension of the container assembly 12 in relation to the surface of the water, the water may be removed from the ballast tank 36 and air introduced therein to increase the buoyancy of the present invention. The step of propelling the container assembly through the body of water to various collection sites or to the shore for off-loading the collected mixture by means of a propulsion system may be further incorporated.

Consistent with the foregoing techniques and methods of the present inventive principles, it will be readily appreciated by those skilled in the art that because the buoyancy of brine shrimp eggs in relation to live and dead brine shrimp is generally more buoyant, the brine shrimp eggs (or cysts) typically float at or near the surface of the water while the live and dead brine shrimp are commonly disposed therebelow. It is this inherent relationship that provides the capability of extracting excess water and the unwanted debris, including, but not limited to, live and dead brine shrimp, from the mixture of water, brine shrimp eggs, and other debris.

In further detail, a concentration assembly 60 is preferably utilized to encourage the collection and introduction of a concentrated mixture of water, brine shrimp eggs, and other debris into the collection reservoir 30 of the container assembly 12. In operation, water may be introduced into one or more ballast chambers 36 formed in the body 18 of the container assembly 12 to provide a means for submerging the floatable container apparatus 10 in relation to a water level whereupon the front panel 26 may be disposed at a point below the surface of the water. Correspondingly, the front panel 26 may be disposed in an open position to allow the water level entering the internal periphery of the container assembly 12 to equalize between the water level outside the container. Accordingly, the general floatation of the container assembly 12 may be maintained by a buoyant support member 11 and/or one or more air-tight chambers 34 formed in the side walls 20a, 20b. In addition, an internal ballast tank 36 may be integrally disposed within the elongated body 18 of the container assembly 12 beneath the bottom panel 22.

With the container assembly 12 in a partially submerged state, and with the front panel 26 disposed in an open position, the front panel 26 may be manipulated beneath the skirt 66 of the containment boom apparatus 62 of the concentration assembly 60, thus allowing a mixture of water, brine shrimp eggs, and other debris to floatably flow into the collection reservoir 30 of the container assembly 12. If desired, the introduction of the mixture of water, brine shrimp eggs, and other debris may be aided by the use of hand tools, as well as the retrieval of the containment boom apparatus 62 by means of a conventional boom retrieval assembly 70. According to one presently preferred method of the present invention, there is preferably no need to agitate the brine shrimp eggs into a slurry mixture as the prior art typically requires, rather the mixture of water, brine shrimp egg, and other debris are allowed to float in its natural buoyant state into the container assembly 12 preferably with the aid of the concentration assembly 60.

The concentrated mixture of water, brine shrimp eggs, and other debris collected within the internal periphery of the collection reservoir 30 of the container assembly 12 is preferably allowed to settle with the front panel 26 operably disposed in a closed position. After settling, the brine shrimp eggs generally tend to float to the surface of the collected mixture thus leaving the unwanted debris, including, but not limited to, live and dead shrimp disposed therebeneath. The excess water and the dead and live brine shrimp may then be removed by means of an extraction assembly 44 or delivery assembly 80, thus leaving the remaining mixture of water, brine shrimp eggs and other debris in the container assembly 12. The remaining mixture of water, brine shrimp eggs, and other debris may then be pumped into an adjacent container assembly 12b and the process repeated, if desired, or the remaining mixture may be transported to at least one water-permeable container. Alternatively, the second container 12b may be consecutively filled with brine shrimp eggs without pumping the collected material from one container to the other.

After the harvesting process has been accomplished, the water introduced within the internal surface area of the ballast tank 36 may be removed by means of conventional vent tubing 38. In this regard, the floatable container apparatus 10 may then be moved to a different location and the process repeated. Once the collection reservoir 30 of the container assemblies 12 are filled; a propulsion system generally provides a means for moving the floatable container apparatus 10 to the shored where the remaining mixture of water, brine shrimp eggs, and other debris are removed from the collection reservoir 30 by means of a conventional delivery assembly 80 and introduced into at least one or more water-permeable containers for storage. After disposed within one or more containers, the collected brine shrimp eggs may be transported to a processing plant wherein the eggs may be further separated from any residual debris, washed, dried, and vacuum-packed for storage.

From the above discussions it will be appreciated than the present invention provides a novel floatable container apparatus and methods for harvesting brine shrimp eggs. Additionally, the present invention is capable of harvesting a mixture of water, brine shrimp eggs, and other debris while returning a substantial portion of the debris, including dead and live brine shrimp, back into the body of water from where it was collected, thus providing a means for preserving the integrity of this natural resource for future brine shrimp reproduction and accommodating the ecological food chain that dead and live brine shrimp may play in the natural scheme of things. The present invention further simplifies the harvesting process as a result of its few moving parts and which is easy to use, economically viable, long lasting and relatively trouble free in operation.

Unlike the prior art, the present invention is capable of collecting a mixture of water, brine shrimp eggs, and other debris without agitating the mixture into a slurry. Moreover, the present invention facilitates a more efficient mode of harvesting in relation to the time and labor expended by way of separating the brine shrimp eggs from the debris which is collected as part of the mixture, thus increasing overall productivity and competitive economic advantage.

Consistent with the foregoing, although the title of the present invention and the detailed description as herein provided are particularly focused on an application of the present invention to the harvesting of brine shrimp eggs, it will be readily appreciated by those skilled in the art that the inventive principles set forth herein may be applied to harvesting other materials or substances floating at or near the surface of a body of water. In particular, the features of the present invention may be readily adapted to collect and separate other types of floating materials or substances from a floatable mixture. Whereas, it is intended that the presently preferred application of the present invention for harvesting brine shrimp eggs as disclosed herein be viewed as exemplary of the principles of the present invention, and not as restrictive to a particular material or substance for implementing those principles.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A floatable container apparatus for harvesting brine shrimp eggs floating at or near a surface of a body of water, the floatable container apparatus comprising:

a buoyant container assembly having a first end, a second opposing end, and an opening formed therein, said container assembly comprising a collection reservoir disposed between said first and second ends, said collection reservoir having an internal periphery sufficient for collecting a mixture of water, brine shrimp eggs, and other debris;

at least one ballast tank operatively disposed in relation to said container assembly, said ballast tank providing a controllable means for raising and lowering said container assembly in relation to said surface of said body of water;

an assembly for extracting excess water and a substantial portion of said debris from said mixture of water, brine shrimp eggs, and debris collected within said collection reservoir and delivering said extracted water and debris to said body of water, said extraction assembly operably disposed in fluid communication with said opening of said container assembly; and an assembly for delivering a remaining mixture of water, brine shrimp eggs, and debris to at least one porous container, said delivery assembly selectively disposed in fluid communication with said remaining mixture in said collection reservoir.

2. A floatable container apparatus as defined in claim 1 further comprising a concentration assembly for selectively introducing said mixture of water, brine shrimp eggs, and other debris into said collection reservoir.

3. A floatable container apparatus as defined in claim 1 wherein said container assembly further comprises a bottom panel disposed perpendicular to at least two opposing side walls, wherein at least one of said side walls includes an air-tight chamber formed therein.

4. A floatable container apparatus as defined in claim 1 wherein said container assembly comprises a panel disposed at said first end, said panel being selectively positionable between an open position and a closed position.

5. A floatable container apparatus as defined in claim 4 wherein said open position of said panel providing an opening for allowing said mixture of water, brine shrimp eggs, and other debris to flow into said collection reservoir.

6. A floatable container apparatus as defined in claim 4 wherein said closed position of said panel provides a means for restricting fluid passage between said collection reservoir and said body of water.

7. A floatable container apparatus as defined in claim 1 wherein said collection reservoir comprises a general semi-cylindrical configuration.

8. A floatable container apparatus as defined in claim 1 wherein said ballast tank comprises selectively controllable fill and vent tubing.

9. A floatable container apparatus for harvesting brine shrimp eggs floating at or near a surface of a body of water, the floatable container apparatus comprising:

a buoyant container assembly having a first end, a second end, and an elongated body disposed therebetween;

a collection reservoir disposed in relation to said elongated body of said container assembly and disposed between said first and second ends, said collection reservoir having an internal periphery sufficient for collecting a mixture of water, brine shrimp eggs, and other debris;

at least one ballast tank operatively disposed in relation to said container assembly, said ballast tank providing a controllable means for raising and lowering said container assembly in relation to said surface of said body of water;

a panel disposed at said first end of said container assembly, said panel being selectively positionable between an open position and a closed position;

said open position of said panel providing an opening for allowing said mixture of water, brine shrimp eggs, and other debris to be introduced within said collection reservoir;

said closed position of said panel providing a means for restricting fluid passage between said collection reservoir and said body of water;

an assembly for extracting excess water and a substantial portion of said debris from said mixture of water, brine shrimp eggs, and debris collected within said collection reservoir and delivering said extracted water and debris to said body of water; and an assembly for delivering a remaining mixture of water, brine shrimp eggs, and debris to at least one porous container.

10. A floatable container apparatus as defined in claim 2 further comprising a concentration assembly for selectively introducing said mixture of water, brine shrimp eggs, and other debris into said collection reservoir.

11. A floatable container apparatus as defined in claim 9 wherein said container assembly further comprises a bottom panel disposed perpendicular to at least two opposing side walls, wherein at least one of said side walls includes an air-tight chamber formed therein.

12. A floatable container apparatus as defined in claim 9 wherein said collection reservoir comprises a general semi-cylindrical configuration.

13. A floatable container apparatus as defined in claim 9 wherein said ballast tank comprises selectively controllable fill and vent tubing.

14. A method for harvesting brine shrimp eggs comprising the steps of:

partially submerging a container assembly in relation to a body of water, wherein said container assembly comprising a buoyant capacity;

collecting a mixture of water, brine shrimp eggs, and other debris in said container assembly;

extracting excess water and a substantial portion of said debris from said collected mixture;

depositing said extracted water and debris into said body of water;

increasing said buoyant capacity of said container assembly; and delivering a remaining mixture of water, brine shrimp eggs, and other debris to at least one porous container.

15. A method for harvesting brine shrimp eggs as defined in claim 14 wherein said buoyant capacity comprises a ballast tank integrally formed within said container assembly.

16. A method for harvesting brine shrimp eggs as defined in claim 14 further comprising the step of concentrating the mixture of water, brine shrimp eggs, and other debris.

17. A method for harvesting brine shrimp eggs as defined in claim 14 further comprising the step of disposing a front panel of said container assembly into an open position to provide a means for introducing said mixture of water, brine shrimp eggs, and other debris.

18. A method for harvesting brine shrimp eggs as defined in claim 17 further comprising the step of disposing said front panel in a closed position after collecting said mixture of water, brine shrimp eggs, and other debris within said container assembly.

19. A method for harvesting brine shrimp eggs as defined in claim 14 further comprising the step of delivering said remaining mixture of water, brine shrimp eggs, and other debris into a corresponding container assembly.

20. A method for harvesting brine shrimp eggs as defined in claim 14 further comprising the step of moving the container assembly to various collection sites.

* * * * *